US006742193B2

(12) United States Patent
Graziosi et al.

(10) Patent No.: US 6,742,193 B2
(45) Date of Patent: Jun. 1, 2004

(54) ENVIRONMENTAL PRESSURE SUITS AND METHOD OF MANUFACTURE

(75) Inventors: David Graziosi, Magnolia, DE (US); Donald R. Cohee, Felton, DE (US); Steven M. Lloyd, Smyrna, DE (US)

(73) Assignee: ILC Dover, Inc., Frederica, DE (US)

( * ) Notice: Subject to any disclaimer, the term of this patent is extended or adjusted under 35 U.S.C. 154(b) by 98 days.

(21) Appl. No.: 09/980,822

(22) PCT Filed: Apr. 27, 2001

(86) PCT No.: PCT/US01/13641

§ 371 (c)(1), (2), (4) Date: Dec. 6, 2001

(87) PCT Pub. No.: WO01/84020

PCT Pub. Date: Nov. 8, 2001

(65) Prior Publication Data

US 2003/0097701 A1 May 29, 2003

Related U.S. Application Data

(60) Provisional application No. 60/200,465, filed on Apr. 28, 2000.

(51) Int. Cl.[7] ............................ B63C 11/04; B64G 6/00

(52) U.S. Cl. ................................. 2/456; 2/2.11; 2/2.12; 2/2.13; 2/2.15; 2/2.16; 2/67; 2/68; 428/152; 600/20

(58) Field of Search .......................... 2/2.11, 2.13, 2.12, 2/2.15, 216, 456, 67, 68; 600/20; 428/152

(56) References Cited

U.S. PATENT DOCUMENTS

| | | | | |
|---|---|---|---|---|
| 2,954,562 A | | 10/1960 | Krupp | |
| 3,562,809 A | | 2/1971 | Hardy et al. | |
| 3,574,863 A | | 4/1971 | Korabowski et al. | |
| 3,699,589 A | | 10/1972 | Durney | |
| 3,705,426 A | | 12/1972 | Marcum, Jr. et al. | |
| 4,227,262 A | | 10/1980 | Insulan et al. | |
| 5,003,630 A | | 4/1991 | Bassick et al. | |
| 5,840,412 A | * | 11/1998 | Wood et al. | 428/152 |
| 6,290,642 B1 | | 9/2001 | Reinhard et al. | |

FOREIGN PATENT DOCUMENTS

| | | |
|---|---|---|
| JP | 6053491 | 3/1985 |

OTHER PUBLICATIONS

Copy of International Search Report dated Apr. 15, 2002.

* cited by examiner

*Primary Examiner*—John J. Calvert
*Assistant Examiner*—Robert H. Muromoto, Jr.
(74) *Attorney, Agent, or Firm*—Stevens, Davis, Miller & Mosher, L.L.P.

(57) ABSTRACT

A method of fabricating an articulated joint for a pressure vessel, especially a pressure suit, by separately forming a structural fabric and a gas barrier layer into a series of alternating peaks and valleys. The structural fabric can be formed into the three dimensional shape by patterning or heat shrinkage. The resulting articulated joint, pressure vessels and pressurized suits are also described.

29 Claims, 3 Drawing Sheets

FIG. 2
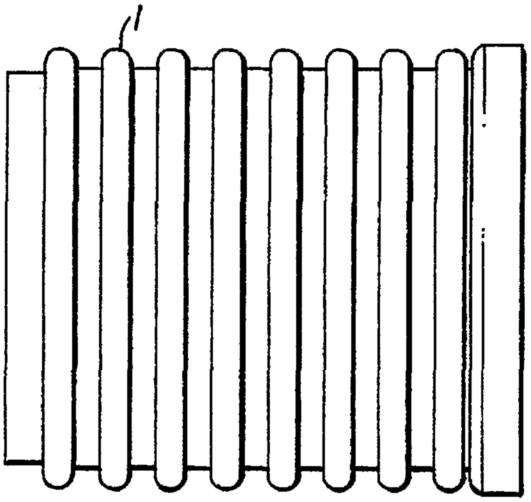
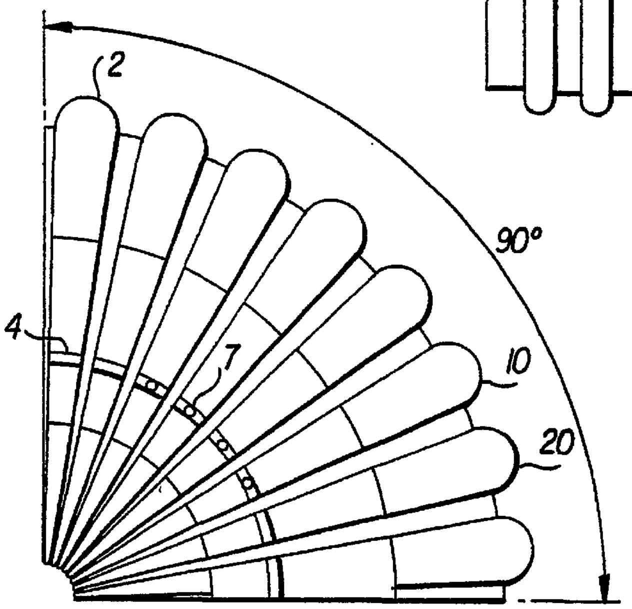
FIG. 3
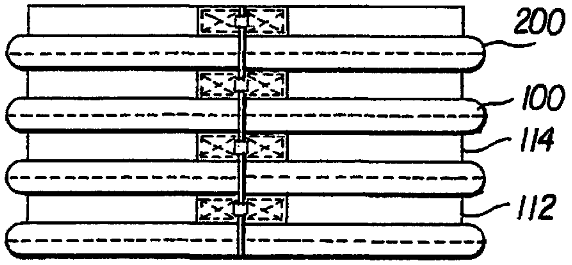
FIG. 4
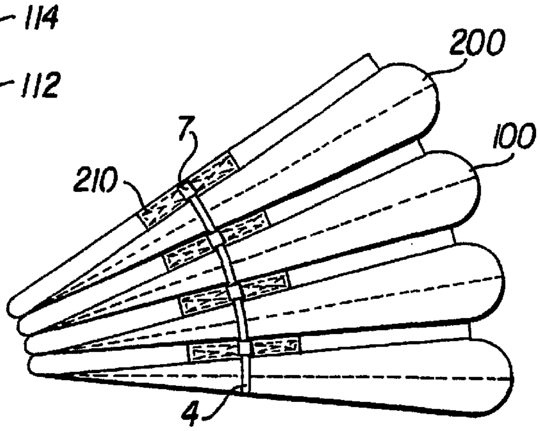
FIG. 5

ENVIRONMENTAL PRESSURE SUITS AND METHOD OF MANUFACTURE

This application claims the benefit of provisional application No. 60/200,465, filed Apr. 28, 2000.

BACKGROUND OF THE INVENTION

1. Field of the Invention

Pressure vessels can be made out of fabric and elastomeric film, which allows the pressure vessel to articulate. A primary application of such an articulation is for joints in pressure suits to be used in environments where the ambient atmospheric pressure is insufficient to support human life. The design of the pressure vessel incorporates a series of ridges which are collapsed or expanded as the joint is moved from side to side, and the joint, when attached to other parts of a pressure suit, complete an entire pressure vessel. The articulated design can be used at anyplace on a suit where movement is desired, but has particular utility for shoulder and waist components of such suits.

2. Description of the Related Art

Pressure vessels, in particular, pressure suits to be used in environments where ambient atmospheric pressure is insufficient to support human life, e.g. beyond the earth's atmosphere are generally known. However, it would be of great benefit if such pressure suits were provided. with a means to permit the pressurized vessel to articulate. Particular areas where articulation is desirable is at the shoulder, waist, knees, elbows, hip or ankles of a human within the suit. We have found that if an ordinary pressure vessel, which typically consists of a two layer construction using a structural fabric layer and a gas barrier layer, is provided with the articulated structure according to the invention, the resulting environmental suit provides nearly effortless motion by the occupant of the suit at elevated pressures.

OBJECTS AND SUMMARY OF INVENTION

It is therefore an object of the invention to improve pressure vessels and pressure suits in particular, to provide an articulated joint at any place on the suit where movement is desired. Such movements are typically desired at the shoulder, waist, knees, elbows, hip and ankles of the occupant of the suit. It is a further object of the invention to provide improved pressurized suits wherein the articulated section of the suit may be readily attached to suits of existing construction with the result that the joint provides near effortless motion of the occupant at elevated pressures.

It is a further object of the invention to provide such articulated joints in pressure suits where the length of the joints is limited, where the means to control the motion of the joint as it is flexed also provide a smooth motion of the joint throughout its range.

It is a still another object of the invention to provide a method for manufacturing pressure suits comprising the articulated joint of the instant invention.

These and other objects of the invention will become apparent by reference to the accompanying drawings and the detailed description of the preferred embodiments.

BRIEF DESCRIPTION OF THE DRAWINGS

FIG. 2 is a schematic plan view of a thermally formed bladder component of the embodiment of the invention shown in FIG. 1;

FIG. 3 is a side view of the shoulder component illustrated in FIG. 1, extended over an angle of 90 degrees;

FIG. 4 is a schematic plan view of a second embodiment of the invention suitable for use as a component at the waist of the wearer of a pressure suit;

FIG. 5 is a side view of the embodiment of FIG. 4;

DETAILED DESCRIPTION OF THE PREFERRED EMBODIMENTS

The invention is directed to a design of a pressure vessel made of a structural fabric and an elastomeric film which allows the pressure vessel to articulate. The primary application of the invention is for joints in pressure suits, which suits are to be used in environments where the ambient pressure is insufficient to support human life. As shown in one embodiment of the invention of FIG. 1, the design incorporated a series of ridges 10, 20, etc., which are collapsed or expanded as the joint is moved from side to side; see FIG. 3. The joint is attached to other parts of the suit to complete an entire pressure vessel. This design can be used at any place on the suit where movement is desired, especially at the shoulder and waist of the suit.

The pressure vessel will, in all embodiments of the invention, comprises a minimum of a two layer construction, using a structural fabric layer on the exterior, and a gas barrier layer on the interior. The structural layer contains loads generated by the pressure and the gas barrier layer, or bladder, contains the mass of gas.

Figure 1:
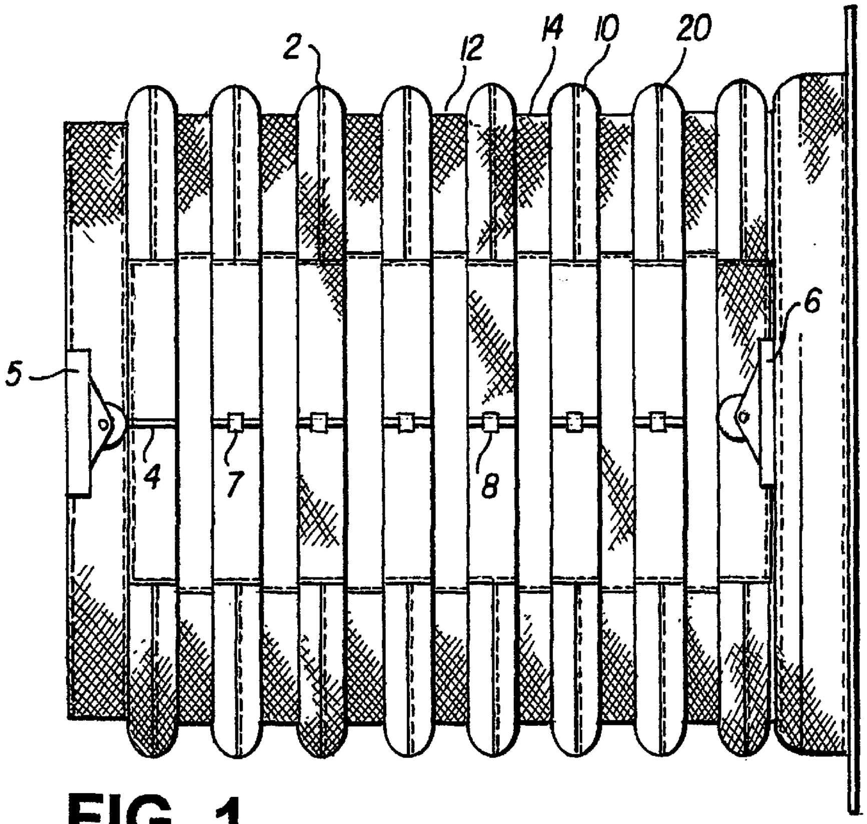
FIG. 1 is a schematic plan view of a first embodiment of the invention, illustrating a structrual fabric component suitable for use as a shoulder joint.

As shown in the various Figures, the general construction of a joint consists of a series of peaks 10, 20 (as shown in FIG. 1) or 100, 200 (as shown in FIG. 4); separated by valleys 12, 14 (as shown in FIG. 1); 112, 114 (as shown in FIG. 4); built into the fabric and bladder layers. The number of peaks (and corresponding valleys) maybe varied without departing from the spirit and scope of the invention, depending on the particular design requirements. However, for shoulder components, we have found that 8 peaks are preferred, whereas for waist components, four peaks are typically utilized.

The patterning of the individual fabric pieces determines the shape the joint takes when pressurized. The bladder closely matches the shape of the structural layer, but is made in two pieces. Each piece is one half of the joint's circumference. This shape is controlled through the design of a mold over which a film is thermally formed, preferably under vacuum. The two pieces are then joined together, preferably by a process which reduces the risk of separation. Thus, although adhesives could be used, we have found that a welded joint is preferable, and radio frequency welding has been found to produce acceptable joints. The thermally formed bladder 1 (FIG. 2) shape and the patterned fabric layer nest together to provide a bladder 1, which moves integrally with the structural layer 2 (FIG. 1) providing near effortless motion at elevated pressures in the suit. The length of the joint is limited by the length of two continuous cords or webbings 3, 4 (only one of which is visible at 4 in FIGS. 1 and 3 being positioned 180° from 4) which attach to the end of the joint, usually at hardware 5,6 (FIG. 1). These cords 3,4, are diametrically opposed to each other. The cords 3,4 also control the motion of the joint as it is flexed to give a smooth motion throughout its range. As shown in FIG. 3, the range of 90 degrees can easily be achieved. The cords 3,4 are attached to the crests or valleys of the structural fabric via webbing 210 (FIGS. 4-5) or may be stitched directly to the joint that allows the cord to travel beside the fabric, not against it. Small metal ferrules 7,8, etc. allow the crests or valleys to move actually along the cord slightly as the joint is flexed. The ferrules can be attached to webbing T-patches, which are attached to the root of the convolute, which, with the band of webbing 210, causes the joint to flex at each convolute providing incremental motion.

We have also studied methods to eliminate the seams at the roots and valleys of each convolute of the structural fabric 2. Elimination of such seams leads to a decrease of bulk in the joint, which results in increased range of motion and decreased work required for motion. Two different methods have been utilized, i.e. yarn displacement and shrinkable fabrics.

Figure 8:
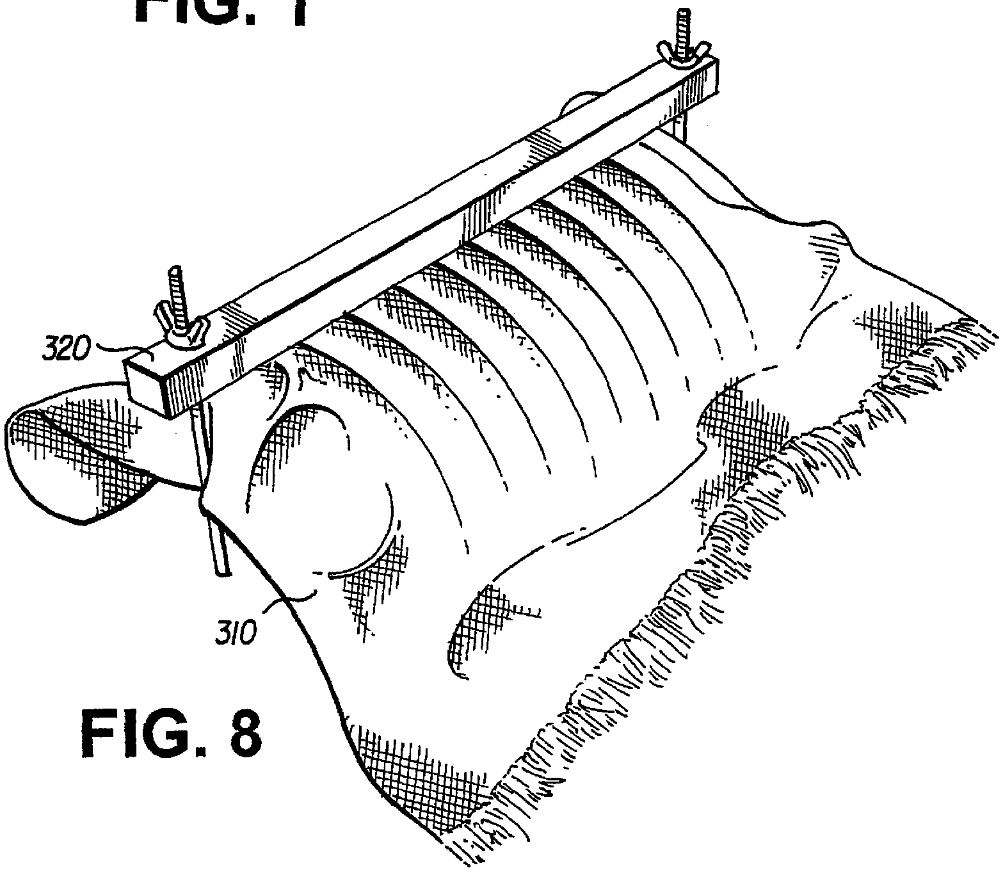
FIG. 8 is a digital photograph of the fabric shaped on the mold.
Figure 6:
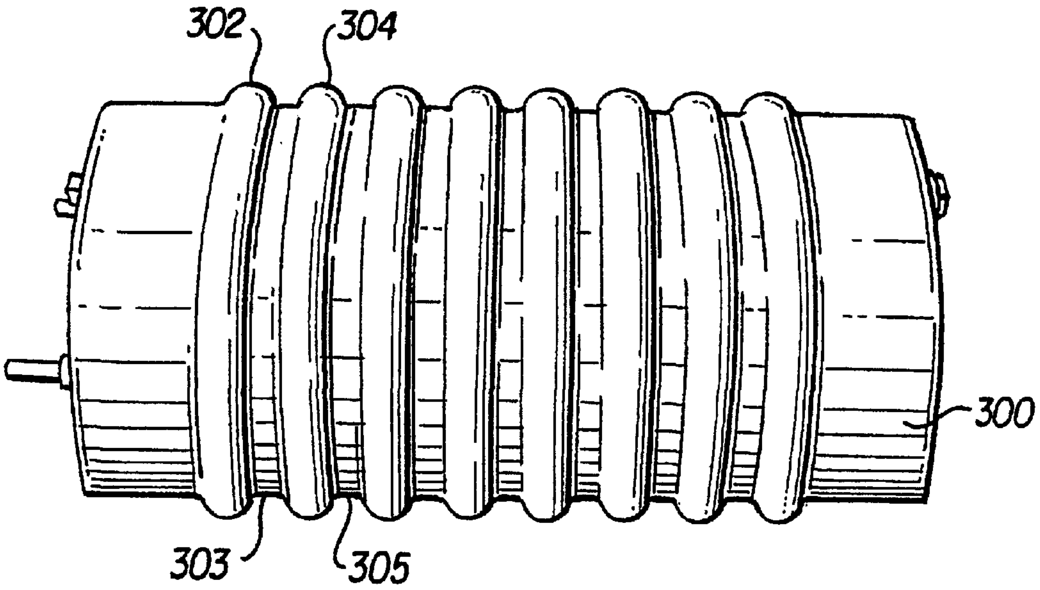
FIG. 6 is a digital photograph of a mold used to form the structural fabric layer.
Figure 7:
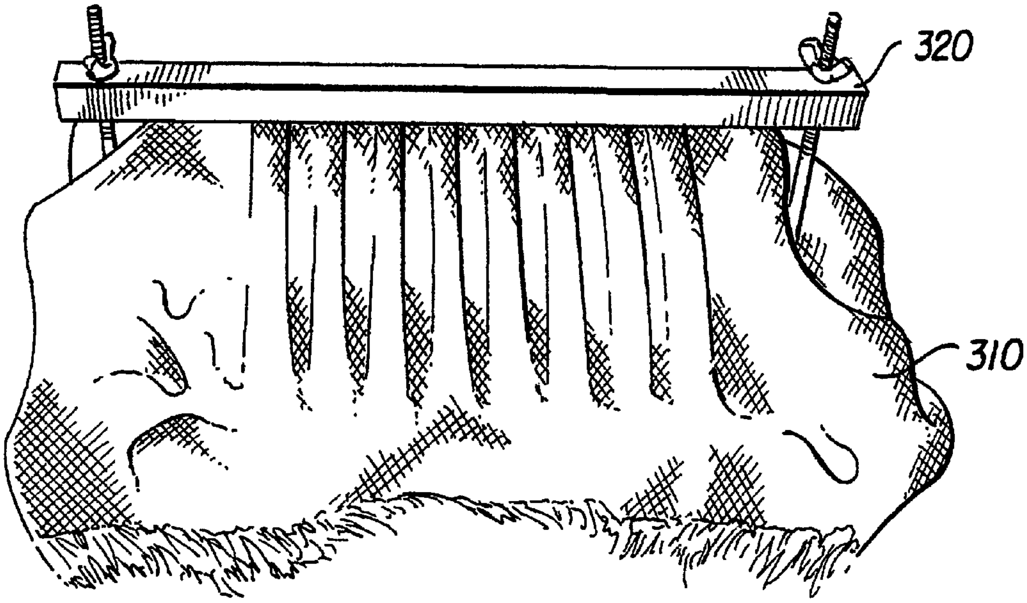
FIG. 7 is a digital photograph of the mold of FIG. 6 covered by a fabric and clamped in place.

In the yarn displacement technique, which utilizes unsized conventional woven fabric, the fabric is draped over a three dimensional mold 300 (FIG. 6) of the desired shape (½ of a convolute restraint). At the center (top) of the mold, the fabric 310 (FIG. 7) is held to the convoluted shaped by a clamp 320. The warp of the fabric is aligned with the top clamp 320. This positions the fill yarns in the direction of the peaks 302, 304, etc. and valleys 303, 305, etc. of the convolutes on the mold 300. The individual fill yarns are then pulled from the bottom (resisted by the clamp 320) until they displace into the roots of the mold. The amount of yarn displacement varies depending on where the yarn is located with respect to a peak or valley. The pull yarns are held in place by a clamp (not shown) until all fill yarns are pulled. The fabric 310 now has a three dimensional shape of the mold; See, FIG. 8. A sizing is then applied to keep the yarns in appropriate positions. Two halves are made in this fashion, trimmed, and sewn together at the interface of the actual restraint line to form the restraint of the joint.

In the shrinkable fabrics method, the same sort of mold 310 as used in the yarn displacement is used. In this case, a fabric is designed and manufactured with preferential shrinkage. We developed a type of fabric having low shrinkage warp yarns and very high shrink (15%) fill yarns. The material is placed on the three dimensional mold, clamped at the center, top, sides, and ends, and the molded fabric placed in an oven and brought up to the shrink temperature of the fabric. The fill yarns will shrink into the valleys of the mold forming a three dimensional fabric. The restraint assembly is then made as above in the yarn displacement technique, i.e. two halves are fashioned, trimmed, and sewn together at the interface of the axial restraint line to form the restraint of the joint.

It can be seen that by the methods of fabrication and the resulting components, we have provided a new design for a pressure vessel made of fabric and elastomeric film which allows the pressure vessel to articulate. Such invention finds utility in the joints of pressure suits, to be used in environments where the ambient pressures are insufficient to support human life, and allows smooth motion throughout the range of movement.

We claim:

1. An articulated joint for a pressure vessel; said joint comprising a layered construction; said layered construction comprising a structural fabric and a gas barrier layer; said structural fabric comprises a series of alternating peaks and valleys which have been formed into the structural fabric; said gas barrier layer being separately formed into a series of alternating peaks and valleys which, when assembled onto said fabric, nest together with said structural fabric to provide a bladder.

2. The articulated joint of claim 1, wherein said gas barrier layer is formed by joining two halves by welding the halves together.

3. The articulated joint of claim 1, wherein said series of alternating peaks and valleys is formed by patterning the fabric.

4. The articulated joint of claim 1, wherein said series of alternating peaks and valleys is formed by using a shrinkable fabric as the structural fabric.

5. The articulated joint of claim 1, further comprising a joint length limiting element attached to said joint which limits the length to which the joint can be extended.

6. The articulated joint of claim 5, wherein said joint length limiting element is two cords positioned 180° apart on said joint.

7. The articulated joint of claim 5, wherein said cords are attached to said joint via webbing or may be stitched directly to the joint. webbing or may be stitched directly to the joint.

8. The articulated joint of claim 7, wherein said attachment of said cords also controls the motion of the joint as it is flexed.

9. A pressure suit comprising the articulated joint of claim 1 attached to other parts of the suit.

10. A pressure vessel comprising the articulated joint of claim 1.

11. The pressure suit of claim 9, wherein the articulated joint of claim 1 is present in at least one of the shoulder, waist, elbows, hip or ankle of the occupant of the suit.

12. A method of making an articulated joint from a layered construction of structural fabric and a gas barrier layer, said method comprising: forming said structural fabric into a three dimensional shape comprising alternating peaks and valleys; forming one half of a three dimensionally shaped gas barrier layer into a series of alternating peaks and valleys, joining said one half to an identical half, and nesting said structural fabric within said gas barrier layer.

13. The method according to claim 12, wherein said joining is by welding.

14. The method according to claim 12, further comprising heat shrinking said structural fabric to form it into said three dimensional shape.

15. The method according to claim 12, wherein said forming into a three dimensional shape is achieved by patterning the fabric.

16. The method according to claim 12, further comprising attaching length limiting elements to said articulated joint.

17. The method according to claim 16, wherein said length limiting elements are selected from the group consisting of cords and webbing.

18. The method according to claim 12, wherein said structural fabric comprises an unsized conventional woven fabric, draping said fabric over a three dimensional mold of alternating peaks and valleys, aligning the fill yarns of said woven fabric so as to be parallel to said valleys, clamping the fabric at the top of said peaks and pulling said full yarns to displace the full yarns into the valleys.

19. The method according to claim 12, further comprising applying a size to the displaced fill yarns to maintain them in position.

20. The method according to claim 12, wherein said structural fabric comprises a fabric with preferential shrinkage, said fabric having low shrinkage warp yarns and high shrinkage fill yarns, draping the fabric over a three dimensional mold of alternating peaks and valleys, aligning the fill yarns along the valleys, clamping the fabric at the center, top, sides and ends of said fabric, heating said fabric to a temperature sufficient to shrink said fill yarns into the valleys of said mold.

21. A pressure suit comprising at least one articulated joint, the joint comprising:

a layered construction; said layered construction comprising a sep structural fabric and a sep gas barrier layer;

said structural fabric comprises a series of alternating peaks and valleys which have been formed into the structural fabric;

said gas barrier layer being separately formed into a series of alternating peaks and valleys which, and nested within said structural fabric to provide a bladder.

22. The pressure suit of claim 21, wherein said gas barrier layer is formed by joining two halves by welding the halves together.

23. The pressure suit of claim 21, wherein said series of alternating peaks and valleys is formed by patterning the fabric.

24. The pressure suit of claim 21, wherein said series of alternating peaks and valleys is formed by using a shrinkable fabric as the structural fabric.

25. The pressure suit of claim 21, further comprising a joint length limiting element attached to said joint which limits the length to which the joint can be extended.

26. The pressure suit of claim 25, wherein said joint length limiting element is two cords positioned 180° apart on said joint.

27. The pressure suit of claim 25, wherein said cords are attached to said joint via webbing or may be stitched directly to the joint.

28. The pressure suit of claim 27, wherein said attachment of said cords also controls the motion of the joint as it is flexed.

29. A pressure suit comprising an articulated joint formed in accordance with claim 12.

* * * * *